(12) United States Patent
Roseberg et al.

(10) Patent No.: US 11,768,845 B2
(45) Date of Patent: Sep. 26, 2023

(54) SYSTEMS AND METHODS AUTOMATICALLY ADJUSTING MINIMUM SUPPORT FOR ROUTING MINING

(71) Applicant: Nice Ltd., Ra'anana (IL)

(72) Inventors: Eran Roseberg, Hogla (IL); Yaron Moshe Bialy, Madrid (ES); Yuval Shachaf, Even Yehuda (IL)

(73) Assignee: Nice Ltd., Ra'anana (IL)

( * ) Notice: Subject to any disclaimer, the term of this patent is extended or adjusted under 35 U.S.C. 154(b) by 86 days.

(21) Appl. No.: 17/496,624

(22) Filed: Oct. 7, 2021

(65) Prior Publication Data
US 2023/0113136 A1    Apr. 13, 2023

(51) Int. Cl.
*G06F 16/2458*    (2019.01)
(52) U.S. Cl.
CPC .............................. *G06F 16/2465* (2019.01)

(58) Field of Classification Search
CPC .................................................. G06F 16/2465
See application file for complete search history.

(56) References Cited

U.S. PATENT DOCUMENTS

| | | | |
|---|---|---|---|
| 2017/0116173 A1* | 4/2017 | Lev-Tov | H04M 3/4936 |
| 2021/0034963 A1* | 2/2021 | Chu | G06F 16/285 |
| 2022/0198265 A1* | 6/2022 | Cintas | G06F 18/40 |
| 2023/0031111 A1* | 2/2023 | Kaveti | G06F 16/2474 |

* cited by examiner

*Primary Examiner* — Apu M Mofiz
*Assistant Examiner* — Husam Turki Samara
(74) *Attorney, Agent, or Firm* — PEARL COHEN ZEDEK LATZER BARATZ LLP

(57) ABSTRACT

A method and system for dynamically determining a minimum support for automation mining is provided. The method and system include modifying the minimum support pattern such that the minimum support can result pattern mining algorithms finding a sufficient number of patterns in a practical duration.

18 Claims, 5 Drawing Sheets

SYSTEMS AND METHODS AUTOMATICALLY ADJUSTING MINIMUM SUPPORT FOR ROUTING MINING

FIELD OF THE INVENTION

The invention relates generally to the field of computer sequence automation, and particular determining minimum support for sequence identification.

BACKGROUND OF THE INVENTION

Organizations may want to identify sequences of often repeated user inputs or actions during computing actions in order to create computer automation sequences (where a computer might automatically perform the actions) or to suggest to a user the best next action for the user to take (e.g. enter into a computer program). Such user actions may be human (e.g. user) inputs to a computer, such as clicking on a data entry field, typing in a name, clicking "continue", etc. and may be organized into business. A process may be a sequence of computer actions e.g., inputs, where typically the actions are related to the same purpose or goal such as moving, aggregating and/or deleting files from memory locations (e.g., folders) on a computer, writing a new webpage, entering a new customer to a system, logging in to a certain application, or finding the status of a customer order. In some scenarios, computers perform the actions. For example, computerized robots may be processes executed by computers which enter the actions into computer executed applications in place of humans entering the actions.

One of the main building-blocks of automation life-cycle is identifying processes that are significant candidates for automation, e.g., feasible for automation and have high potential return on investment (ROI), for example, by saving significant time and/or manual effort when being handled by computers instead of, for example, human agents. Analyzing and discovering the processes to automated manually can be problematic as it can be time consuming, costly, and/or erroneous. For example, candidate processes for automation can be easily missed and/or the discovery process can be biased, time consuming and/or very expensive.

Some current systems for automating processes can include pattern mining algorithms that can be used to identify the automated processes in a data set. Some current pattern mining algorithms can require a minimum support parameter, e.g., a minimum number of times a pattern of actions is found in the dataset in order for the data process to be defined.

Current systems typically define a static minimum support parameter. For example, the static minimum support parameter can be based on a database size, or based on an organization type. However, a static minimum support parameter can be problematic in that a minimum support value that is too high can result in pattern mining algorithms finding too few patterns, whereas a minimum support parameter that is too low can result in a pattern mining algorithm running for an impractical duration (e.g., one hour, hours, or endlessly).

SUMMARY OF THE INVENTION

One advantage of the invention can include providing a minimum support parameter that is optimized such that the pattern mining algorithm finds a maximum number of patterns for the data while running for an efficient duration of time. Another advantage of the invention can include determining a minimum support parameter without fitting and/or collecting functions and/or statistics from the provider of the data set (e.g., customers).

Another advantage of the invention can include an improvement to average memory consumption due to, for example, time saving due to a lower minimum support, which can reduce the number patterns such that pattern mining can consume less memory. Another advantage is reaching pattern mining can be run more quickly.

In one aspect, the invention involves a method for dynamically determining minimum support for automation mining. The method involves receiving, via a computing device, a plurality of sequences. The method involves initializing, via the computing device, a current support based on a number of the plurality of sequences. The method involves initializing, via the computing device, a current number of patterns and a previous number of patterns to zero. The method involves initializing, via the computing device, a previous support to zero. The method involves (i) if the current number of patterns is greater than a predetermined threshold, then set the minimum support to current support otherwise, perform steps (ii) through (x). The method involves (ii) determining, via the computing device, a gradient based on the current number of patterns, the previous number of patterns, the current minimum support and the previous minimum support. The method involves (iii) determining, via the computing device, a support reduction based on the gradient. The method involves (iv) setting, via the computing device, the previous support to the current support. The method involves (v) updating, via the computing device, the current support based on the support reduction. The method involves (vi) setting, via the computing device, the previous number of patterns to the current number of patterns. The method involves (vii) determining, via the computing device, a current number of patterns based on the current support and continue to step (i).

In some embodiments, determining the current number of patterns further comprises calling a pattern mining algorithm. In some embodiments, the pattern mining algorithm is one of Prefixspan, VMSP, or CloSpan. In some embodiments, the time it takes the pattern mining algorithm to run exceeds a predetermined threshold, setting the minimum support to the previous support. In some embodiments, the method involves setting the current support to the minimum support threshold if the current support is below the minimum support threshold.

In some embodiments, determining the support reduction is further based on a predetermined support step reduction value. In some embodiments, updating the current support is further based on a predetermined minimum current support value. In some embodiments, initializing the current support is further based on a percentage of number of the plurality of sequences.

In some embodiments, the method involves determining an inverse gradient, and wherein the support reduction is based on the inverse gradient.

In another aspect, the invention includes a non-transitory computer-program product having instructions that when executed cause the computer-program to receive a plurality of sequences. The non-transitory computer-program product having instructions to cause the computer to initialize a current support based on a number of the plurality of sequences, initialize a current number of patterns and a previous number of patterns to zero, and initialize a previous support to zero. The non-transitory computer-program product having instructions to cause the computer to (i) if the current number of patterns is greater than a predetermined threshold, then set a minimum support to current support otherwise, perform steps (ii) through (x). The non-transitory computer-program product having instructions to cause the computer to (ii) determine a gradient based on the current number of patterns, the previous number of patterns, the current minimum support and the previous minimum support. The non-transitory computer-program product having instructions to cause the computer to (iii) determine a support reduction based on the gradient. The non-transitory computer-program product having instructions to cause the computer to (iv) set the previous support to the current support. The non-transitory computer-program product having instructions to cause the computer to (v) update the current support based on the support reduction. The non-transitory computer-program product having instructions to cause the computer to (vi) set the previous number of patterns to the current number of patterns. The non-transitory computer-program product having instructions to cause the computer to (vii) determine a current number of patterns based on the current support and continue to step (i).

In some embodiments, determining the current number of patterns further comprises calling a pattern mining algorithm. In some embodiments, the pattern mining algorithm is one of Prefixspan, VMSP, or CloSpan. In some embodiments, if the time it takes the pattern mining algorithm to run exceeds a predetermined threshold, setting the minimum support to the previous support.

In some embodiments, the non-transitory computer program product further includes instructions to cause the computer to set the current support to the minimum support threshold if the current support is below the minimum support threshold. In some embodiments, determining the support reduction is further based on a predetermined support step reduction value. In some embodiments, updating the current support is further based on a predetermined minimum current support value.

In some embodiments, initializing the current support is further based on a percentage of number of the plurality of sequences. In some embodiments, the non-transitory computer program product further comprises instructions that cause the computer to determine an inverse gradient, and wherein the support reduction is based on the inverse gradient.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Figure 1:
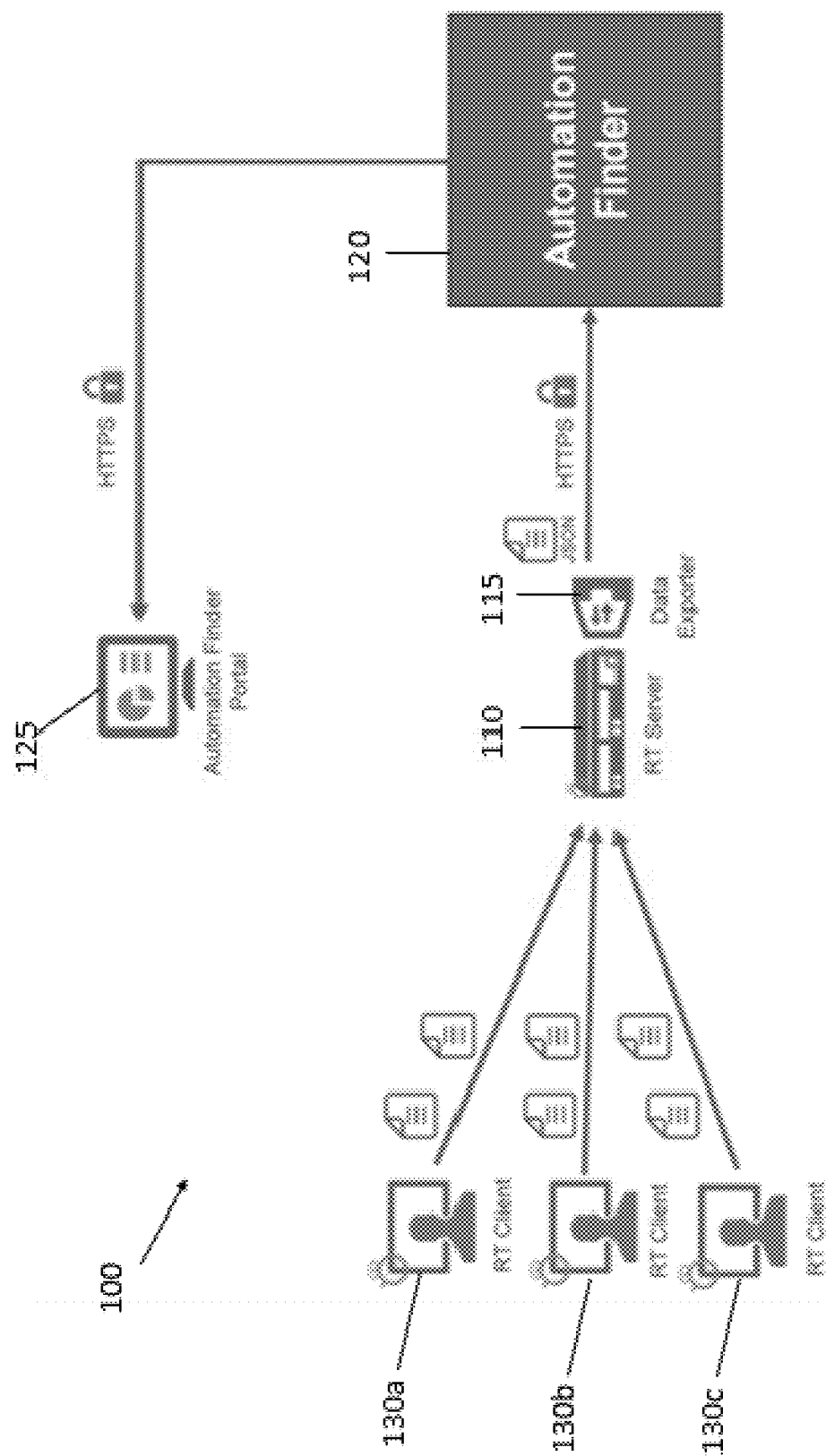
FIG. 1 is a block diagram of a system for automation finding, according to an illustrative embodiment of the invention.

FIG. 1 is a block diagram of a system 100 for automation finding, according to an illustrative embodiment of the invention. The system 100 includes a real-time server 110, a data exporter 115, an automation finder module 120, and an automation finder portal 125.

The real-time server 110 receives data (e.g., data sets) from a plurality of clients 130a, 130b, 130c, generally, 130. The real-time server 110 can communicate with the data exporter 115. The data exporter 115 can transmit the data received by the real-time server to the automation finder module 120. The automation finder module 120 can determine one or more automations (e.g., one or more patterns within actions performed in a dataset that can be automated) from the data based on output of one or more pattern mining algorithms. The automation finder module 120 can transmit the one or more automations to the automation finder portal 125 (e.g., a graphical user interface).

The data from each of the plurality of clients 130 can be client specific. The one or more automations can be client specific. In some embodiments, if the plurality of clients 130 are all in a same field (e.g., web browser development), the automations can be provided to each of the plurality of clients 130.

Figure 2:
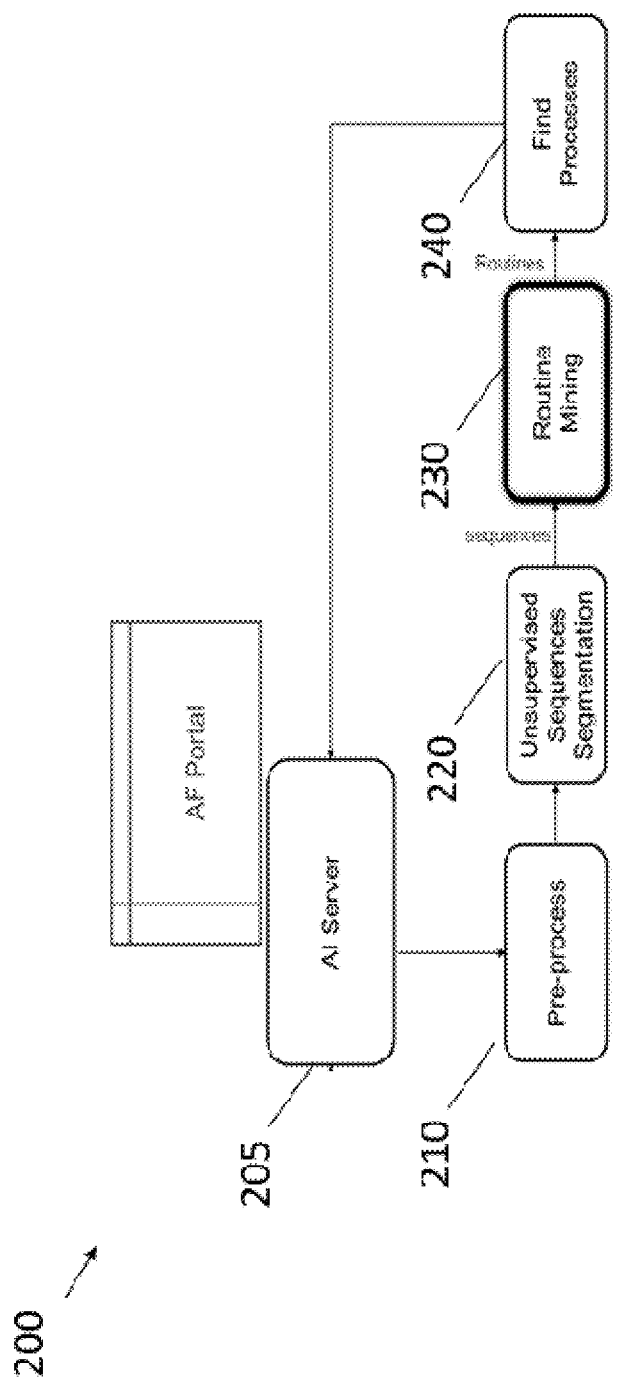
FIG. 2 is a block diagram of a system for the automation finder, according to an illustrative embodiment of the invention.

FIG. 2 is a method 200 for automation finding (e.g., via the system 100 as described above in FIG. 1), according to an illustrative embodiment of the invention. The method can involve pre-processing the plurality of sequences 210. The pre-processing can receive data from an AI server 205. The pre-processing can involve data importation, cleaning, filtering and/or generalizing the plurality of sequences 210. The AI server 205 can process the plurality of sequences 210 to identify automation opportunities.

The method can involve segmenting the pre-processed plurality of sequences 220. The segmenting can parse the plurality of sequences 210 to identify the patterns.

The method can involve routine mining 230 of the segmented pre-processed plurality of sequences 220. The routing mining 230 can involve asserting a pattern mining algorithm and with a minimum support as an input. The minimum support can be determined as described in further detail below.

The method can involve finding process 240. Process can include one or more business processes including automations.

For each dataset the minimum support can change. It can be desirable to set the minimum support such that a pattern mining algorithm can run efficiently (e.g., return results within a practical time period, for example, 1-5 minutes per iteration) and so that a robust number of patterns in the sequences is found. For example, a lower minimum support can result in a higher number of patterns being found with a pattern mining algorithm, however, the pattern mining algorithm can run for a longer time period with a lower minimum support.

Determining the minimum support dynamically can involve setting an initial minimum support to a value that is relative to a number of sequences in the dataset and determining a number of patterns. Next, iteratively decreasing the minimum support value and finding corresponding numbers of patterns until it is determined that the current decrease in the minimum support results is an unacceptable increase in a number of patterns (e.g., a difference from the last number of patterns outside of a threshold, an exponential increase, a non-linear increase or an increase greater than a threshold). Then the minimum support can be set to the minimum support of the iteration right before the minimum increase.

Figure 3:
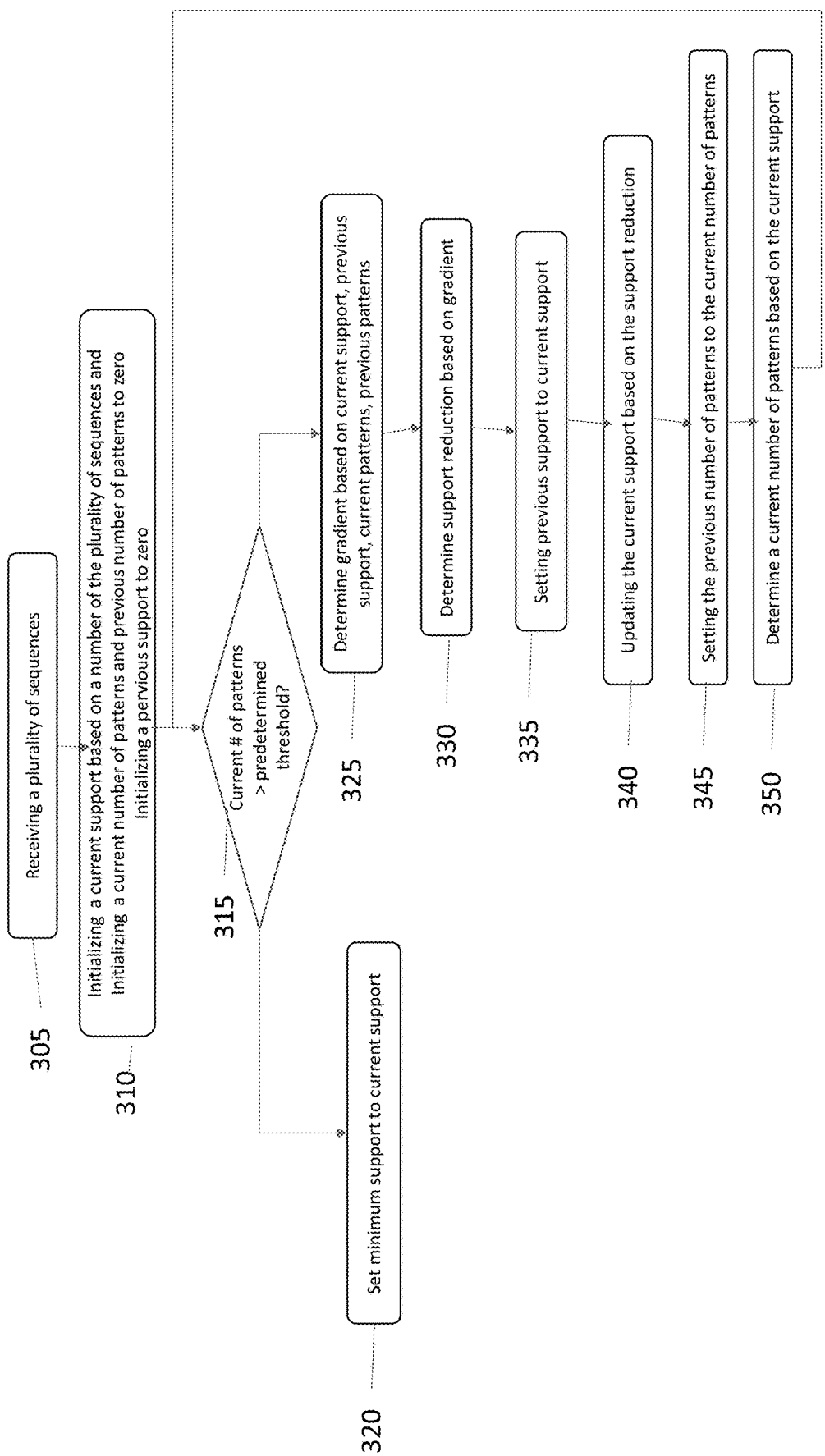
FIG. 3 is a method for dynamically determining minimum support for automation mining, according to an illustrative embodiment of the invention.

FIG. 3 is a flow chart of a method for dynamically determining a minimum support for automation mining, according to some embodiments of the invention. The method can involve receiving a plurality of sequences (Step 305). The plurality of sequences can be determined from data received from one or more clients (e.g., clients 130 as described above in FIG. 1) based on machine learning algorithms.

The method can involve initializing a current support based on a number of the plurality of sequences, a previous support to zero, a current number of patterns to zero and a previous number of patterns to zero (Step 310). The current support can be determined as follows:

$$\text{current support} = A * \text{\# of sequences} \qquad \text{EQN. 1}$$

where A is a decimal value, e.g., 0.2, 0.3, 0.4, or any set value, and the # of sequences is the number of sequences in the plurality of sequences.

The method can involve determining if the current number of patterns is greater than a predetermined threshold, and if the current number of patterns is greater than the predetermined threshold, set the minimum support to current support (Step 320), otherwise, perform steps 325 through 350 (Step 315). The predetermined threshold can be input by a user (e.g., an administrator), a set value, and/or modified for each dataset. The predetermined threshold can be 2000, 3000, 4000, or any integer value.

The method can involve determining a gradient based on the current number of patterns, the previous number of patterns, the current support and the previous support (Step 325). In some embodiments, the gradient is determined as follows:

$$\text{gradient} = \frac{\text{current \# patterns} - \text{previous \# patterns}}{\text{current support} - \text{previous support}} \qquad \text{EQN. 2}$$

In some embodiments, the inverse of the gradient is determined. The inverse of the gradient can be determined as follows:

$$\text{inverse gradient} = \frac{1}{\text{abs}(grad) + 1} \qquad \text{EQN. 3}$$

Where abs is the absolute value, and grad is the gradient as found in EQN. 1. The "+1" in the denominator of EQN. 2 can assist in the initialization when the current support and previous support are initially set to zero to avoid an indefinite answer.

The method can involve determining a support reduction based on the gradient (Step 330). The support reduction can be determined as follows:

$$\text{support reduction} = -\text{intverse gradient} * 10^{int} \\ (\log_{10} \text{current support}) - 0.2 \qquad \text{EQN. 3}$$

In some embodiments, the support reduction can be prevented from going below a predetermined support step reduction value, such that if the support reduction in EQN. 3 is below a predetermined support step reduction value, the support reduction is set to the predetermined support step reduction value. The predetermined support step reduction value can be input by a user or administrator.

The method can involve setting the previous support to the current support (Step 335).

The method can involve updating the current support based on the support reduction (Step 340). The current support can be determined as follows:

$$\text{current support} = \text{previous support} + \text{support reduction} \qquad \text{EQN. 4}$$

where the support reduction is a negative value.

In some embodiments, the current support can be prevented from going below a predetermined minimum current support value, such that if the current support in EQN. 4 is below a predetermined minimum current support value, the current support is set to the predetermined minimum current support value. The predetermined minimum current support value can be input by a user or administrator.

The method can involve setting, via the computing device, the previous number of patterns to the current number of patterns (Step 345).

The method can involve determining, via the computing device, a current number of patterns based on the current support and continue to step (Step 350).

The current number of patterns can be determined by transmitting the current support and the dataset to a pattern mining algorithm. The pattern mining algorithm can be Prefixspan, VMSP, or CloSpan. The a pattern mining algorithm can be any pattern mining algorithm as is known in the art.

Figure 4:
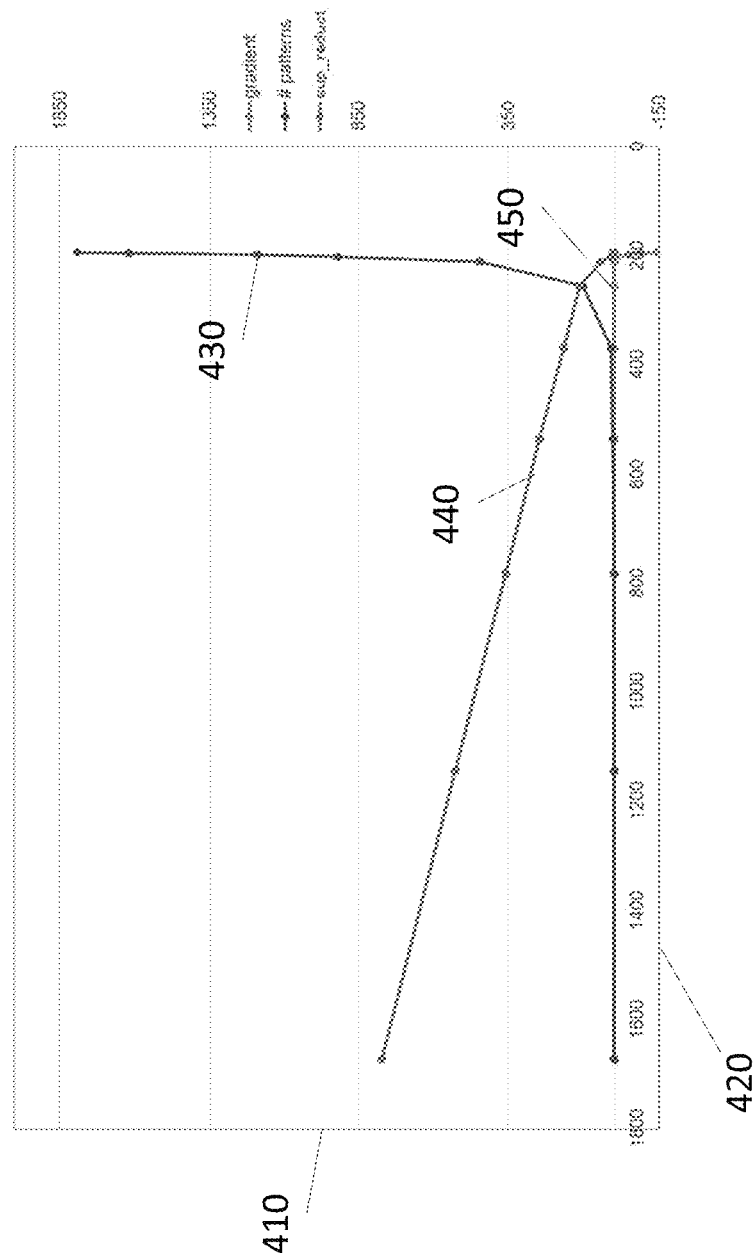
FIG. 4 is a graph showing minimum support values versus number of patterns found, according to an illustrative embodiment of the invention.

FIG. 4 is a graph showing minimum support values versus number of patterns found, in some embodiments of the invention. FIG. 4 can illustrate an example of the method of FIG. 3 that can find an optimal minimum support to achieve a desired number of patterns. The x-axis 410 and y-axis 420 represent an iteration number and number of patterns, respectively. As shown on FIG. 4 there is a number of patterns curve 430, a current support curve 440, and a gradient curve 450. The number of patterns curve 430 shows that the number of patterns remain low until a current support value reaches a critical point which then the number of patterns exponentially increases. The exponential increase can be a juncture where an optimal number of patterns is found.

Figure 5:
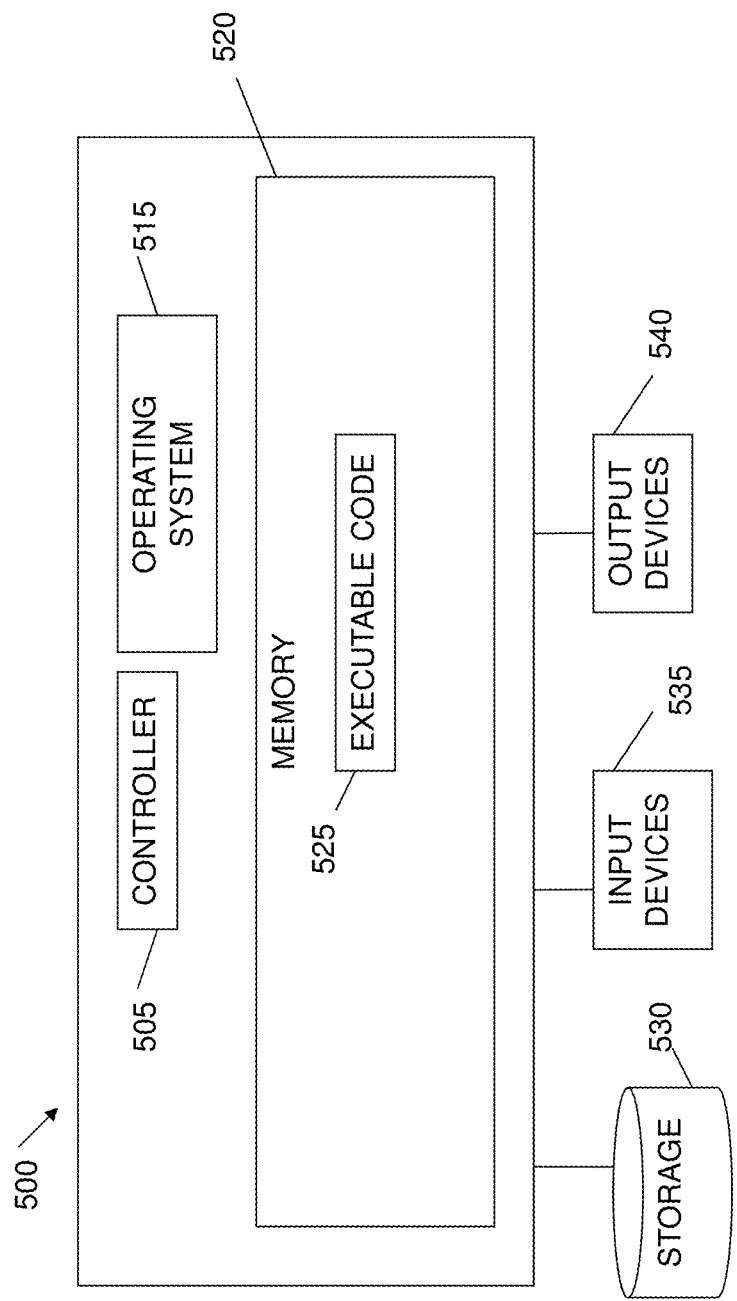
FIG. 5 is a block diagram of a computing device which can be used with embodiments of the invention.

FIG. 5 shows a block diagram of a computing device 500 which can be used with embodiments of the invention. Computing device 500 can include a controller or processor 505 that can be or include, for example, one or more central processing unit processor(s) (CPU), one or more Graphics Processing Unit(s) (GPU or GPGPU), a chip or any suitable computing or computational device, an operating system 515, a memory 520, a storage 530, input devices 535 and output devices 540.

Operating system 515 can be or can include any code segment designed and/or configured to perform tasks involving coordination, scheduling, arbitration, supervising, controlling or otherwise managing operation of computing device 500, for example, scheduling execution of programs. Memory 450 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 520 can be or can include a plurality of, possibly different memory units. Memory 520 can store for example, instructions to carry out a method (e.g. code 525), and/or data such as user responses, interruptions, etc.

Executable code 525 can be any executable code, e.g., an application, a program, a process, task or script. Executable code 525 can be executed by controller 505 possibly under control of operating system 515. For example, executable code 525 can when executed cause masking of personally identifiable information (PII), according to embodiments of the invention. In some embodiments, more than one computing device 500 or components of device 500 can be used for multiple functions described herein. For the various modules and functions described herein, one or more computing devices 500 or components of computing device 500 can be used. Devices that include components similar or different to those included in computing device 500 can be used, and can be connected to a network and used as a system. One or more processor(s) 505 can be configured to carry out embodiments of the invention by for example executing software or code. Storage 530 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 530 and can be loaded from storage 530 into a memory 520 where it can be processed by controller 505. In some embodiments, some of the components shown in FIG. 5 can be omitted.

Input devices 535 can be or can include for example a mouse, a keyboard, a touch screen or pad or any suitable input device. It will be recognized that any suitable number of input devices can be operatively connected to computing device 500 as shown by block 535. Output devices 540 can include one or more displays, speakers and/or any other suitable output devices. It will be recognized that any suitable number of output devices can be operatively connected to computing device 500 as shown by block 540. Any applicable input/output (I/O) devices can be connected to computing device 500, for example, a wired or wireless network interface card (NIC), a modem, printer or facsimile machine, a universal serial bus (USB) device or external hard drive can be included in input devices 535 and/or output devices 540.

Embodiments of the invention can include one or more article(s) (e.g. memory 520 or storage 530) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stored on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

The invention claimed is:

1. A method for dynamically determining minimum support for automation mining, the method comprising:
   receiving, via a computing device, a plurality of sequences;
   initializing, via the computing device, a current support based on a number of the plurality of sequences;
   initializing, via the computing device, a current number of patterns and a previous number of patterns to zero;
   initializing, via the computing device, a previous support to zero;
   (i) if the current number of patterns is greater than a predetermined threshold, then set the minimum support to current support otherwise, perform steps (ii) through (vii);
   (ii) determining, via the computing device, a gradient based on the current number of patterns, the previous number of patterns, the current support and the previous support;
   (iii) determining, via the computing device, a support reduction based on the gradient;
   (iv) setting, via the computing device, the previous support to the current support;
   (v) updating, via the computing device, the current support based on the support reduction;
   (vi) setting, via the computing device, the previous number of patterns to the current number of patterns; and
   (vii) determining, via the computing device, a current number of patterns based on the current support and continue to step (i).

2. The method of claim 1 wherein determining the current number of patterns further comprises calling a pattern mining algorithm.

3. The method of claim 2 wherein the pattern mining algorithm is one of Prefixspan, VMSP, or CloSpan.

4. The method of claim 2 wherein if the time it takes the pattern mining algorithm to run exceeds a predetermined threshold, setting the minimum support to the previous support.

5. The method of claim 1 further comprising setting the current support to a minimum support threshold if the current support is below the minimum support threshold.

6. The method of claim 1 wherein determining the support reduction is further based on a predetermined support step reduction value.

7. The method of claim 1 wherein updating the current support is further based on a predetermined minimum current support value.

8. The method of claim 1 wherein initializing the current support is further based on a percentage of number of the plurality of sequences.

9. The method of claim 1 further comprising determining an inverse gradient, and wherein the support reduction is based on the inverse gradient.

10. A non-transitory computer-program product having instructions that when executed cause a processor to:
    receive a plurality of sequences;
    initialize a current support based on a number of the plurality of sequences;
    initialize a current number of patterns and a previous number of patterns to zero;
    initialize a previous support to zero;
    (i) if the current number of patterns is greater than a predetermined threshold, then set a minimum support to current support otherwise, perform steps (ii) through (vii);
    (ii) determine a gradient based on the current number of patterns, the previous number of patterns, the current support and the previous support;
    (iii) determine a support reduction based on the gradient;
    (iv) set the previous support to the current support;
    (v) update the current support based on the support reduction;
    (vi) set the previous number of patterns to the current number of patterns; and
    (vii) determine a current number of patterns based on the current support and continue to step (i).

11. The non-transitory computer program product of claim 10 wherein determining the current number of patterns further comprises calling a pattern mining algorithm.

12. The non-transitory computer program product of claim 11 wherein the pattern mining algorithm is one of Prefixspan, VMSP, or CloSpan.

13. The non-transitory computer program product of claim 11 wherein if the time it takes the pattern mining algorithm to run exceeds a predetermined threshold, setting the minimum support to the previous support.

14. The non-transitory computer program product of claim 10 further comprising instructions to cause the computer to set the current support to a minimum support threshold if the current support is below the minimum support threshold.

15. The non-transitory computer program product of claim 10 wherein determining the support reduction is further based on a predetermined support step reduction value.

16. The non-transitory computer program product of claim 10 wherein updating the current support is further based on a predetermined minimum current support value.

17. The non-transitory computer program product of claim 10 wherein initializing the current support is further based on a percentage of number of the plurality of sequences.

18. The non-transitory computer program product of claim 10 further comprising instructions that cause the computer to determine an inverse gradient, and wherein the support reduction is based on the inverse gradient.

* * * * *